United States Patent [19]

Adlhart

[11] Patent Number: 4,513,065
[45] Date of Patent: Apr. 23, 1985

[54] HYDROGEN GENERATOR

[75] Inventor: Otto J. Adlhart, Newark, N.J.

[73] Assignee: Engelhard Corporation, Iselin, N.J.

[21] Appl. No.: 610,740

[22] Filed: May 16, 1984

Related U.S. Application Data

[62] Division of Ser. No. 399,057, Jul. 16, 1982, Pat. No. 4,463,063.

[51] Int. Cl.³ .............................................. H01N 8/18
[52] U.S. Cl. ......................................... 429/19; 429/94
[58] Field of Search ................... 429/19, 118, 119, 17, 429/94

[56] References Cited

U.S. PATENT DOCUMENTS

| | | | |
|---|---|---|---|
| 2,850,557 | 9/1958 | Kirk et al. | 429/162 X |
| 3,928,075 | 12/1975 | Bass | 429/119 |
| 3,981,747 | 9/1976 | Doniat et al. | 429/15 |
| 4,175,165 | 11/1979 | Adlhart | 429/30 |
| 4,198,475 | 4/1980 | Zaromb | 429/19 X |
| 4,218,520 | 8/1980 | Zaromb | 429/15 |
| 4,254,190 | 3/1981 | Zaromb | 429/17 X |

Primary Examiner—Charles F. LeFevour

[57] ABSTRACT

This disclosure relates to a replaceable cartridge hydrogen generator of the type which relies at least partially on the process of anodic corrosion to produce hydrogen. A drum contains a plurality of the cartridges.

6 Claims, 4 Drawing Figures

HYDROGEN GENERATOR

This is a division of application Ser. No. 399,057 filed July 16, 1982, now U.S. Pat. No. 4,463,063.

BACKGROUND OF THE INVENTION

This invention relates to hydrogen generators, and more particularly, to a cartridge-type hydrogen generator which relies at least partially on the process of anodic corrosion to produce hydrogen.

Hydrogen generators which produce quantities of hydrogen of relatively high purity have many uses. One such use is to provide hydrogen fuel to a fuel cell power generation system. Fuel cell systems, especially those used in remote locations, are equipped with integral fuel sources to operate the cell over a period of time. One approach for supplying hydrogen to the cell is by having a hydrogen generator located at the fuel cell to supply the needs of the cell. Such hydrogen generators are desirably demand responsive; that is, they produce hydrogen only when the fuel cell needs it. Demand responsive generators should be designed to require little or no hydrogen storage after the hydrogen is generated and before it is supplied to the fuel cell. This is beneficial from the safety standpoint.

One type of known hydrogen generator uses a gas generator cartridge. Hydrogen is produced by the reaction of water and a solid cartridge charge, such as a calcium hydride which reacts vigorously with water, to generate hydrogen gas and leave a solid residue in the form of a metal hydroxide. Hydrogen generators employing cartridges of this type normally employ a reservoir of water or provide a chamber into which water is supplied and brought into contact with the cartridge charge. When it is desired to generate hydrogen, one or more cartridges are placed in a reaction tank and then water is supplied to the reaction tank. As the water level rises, it comes into contact with and covers the cartridge. A liner in the cartridge becomes saturated with water and the water passes therethrough and into contact with the cartridge's charge. The water reacts exothermically with the particles to form calcium hydroxide and hydrogen gas.

In demand responsive hydrogen generators, there are several aspects of the hydrogen generation system which are of importance. The first is the ability to precisely control the hydrogen formation process; that is, the ability to start the process and stop the process substantially instantaneously. The generator, desirably, should not have a lag factor in providing hydrogen to the system that utilizes it, such as a fuel cell, which could jeopardize the continuous operation of the system. Similarly, the generator, desirably, should not have a lag factor in stopping the formation of hydrogen after the requirements of the system to which it is fed have been satisfied since the excess hydrogen would have to be bled off or placed in some sort of storage facility. Having to bleed off excess hydrogen would, of course, waste a portion of the hydrogen produced and make the generator somewhat inefficient. A second important consideration is the rate of hydrogen production during the generator's operation. The formation of hydrogen should be at a sufficiently high rate for the application intended. It is also desirable to have the generator employ an anodic material of high energy density, to have a high output of hydrogen for the volume and weight of the cartridge and a high degree of utilization of the reactants.

It is an object of the invention to provide a demand responsive hydrogen generator.

It is a further object of the invention to provide a hydrogen generator which can be turned on and off substantially instantaneously.

It is a further object of the invention to provide a hydrogen generator which has a high energy density and improves the rate of hydrogen formation relative to the amount of materials employed.

It is a further object of the invention to provide a replaceable cartridge-type hydrogen generator.

It is a further object of the invention to provide a compact hydrogen generator relative to the amount and rate of hydrogen generated thereby.

SUMMARY OF THE INVENTION

The invention relates to a cartridge-type hydrogen generator which relies at least partially on the process of anodic corrosion to produce hydrogen having a consumable anodic material and a cathodic material which are at least partially immersed in an electrolyte. The operation of the generator is controlled by switching an electrical line which controls the current flow between the anode and cathode.

In a preferred embodiment of the invention, the anodic and cathodic materials form parts of the replaceable cartridge. The cartridge has a container which supports the anodic material therein and holds the electrolyte. The container can serve as the cathode and have an electrical line joined thereto which is connected to the anode after passing through a switch means. The switch means, when allowing current to flow in the line, enables the generator to produce hydrogen and, when preventing current from flowing, disables the generator from producing hydrogen. In a further preferred embodiment of the invention, the anodic material is magnesium, aluminum, or a magnesium or aluminum alloy and the container material is steel. The anodic material has a shape which emphasizes its surface area relative to its volume. The cathodic material is configured to be located closely adjacent to as much of the surface area of the anodic material as practical.

In a still further preferred embodiment, the container is in the shape of a cylinder, the anodic material is substantially coaxially located therein and a steel sheet or mesh material is substantially coaxially located therein around and closely adjacent the anodic material. The anodic material cylinder is long relative to its diameter to form a large surface area to interact with the closely adjacent steel mesh. The cartridge can be arranged in any position as long as the anode is at least partially covered by the electrolyte. An upright position is preferred.

BRIEF DESCRIPTION OF THE DRAWINGS

The invention is described with respect to specific embodiments thereof which are illustrated in the following drawings wherein.

DETAILED DESCRIPTION OF THE INVENTION

Figure 1:
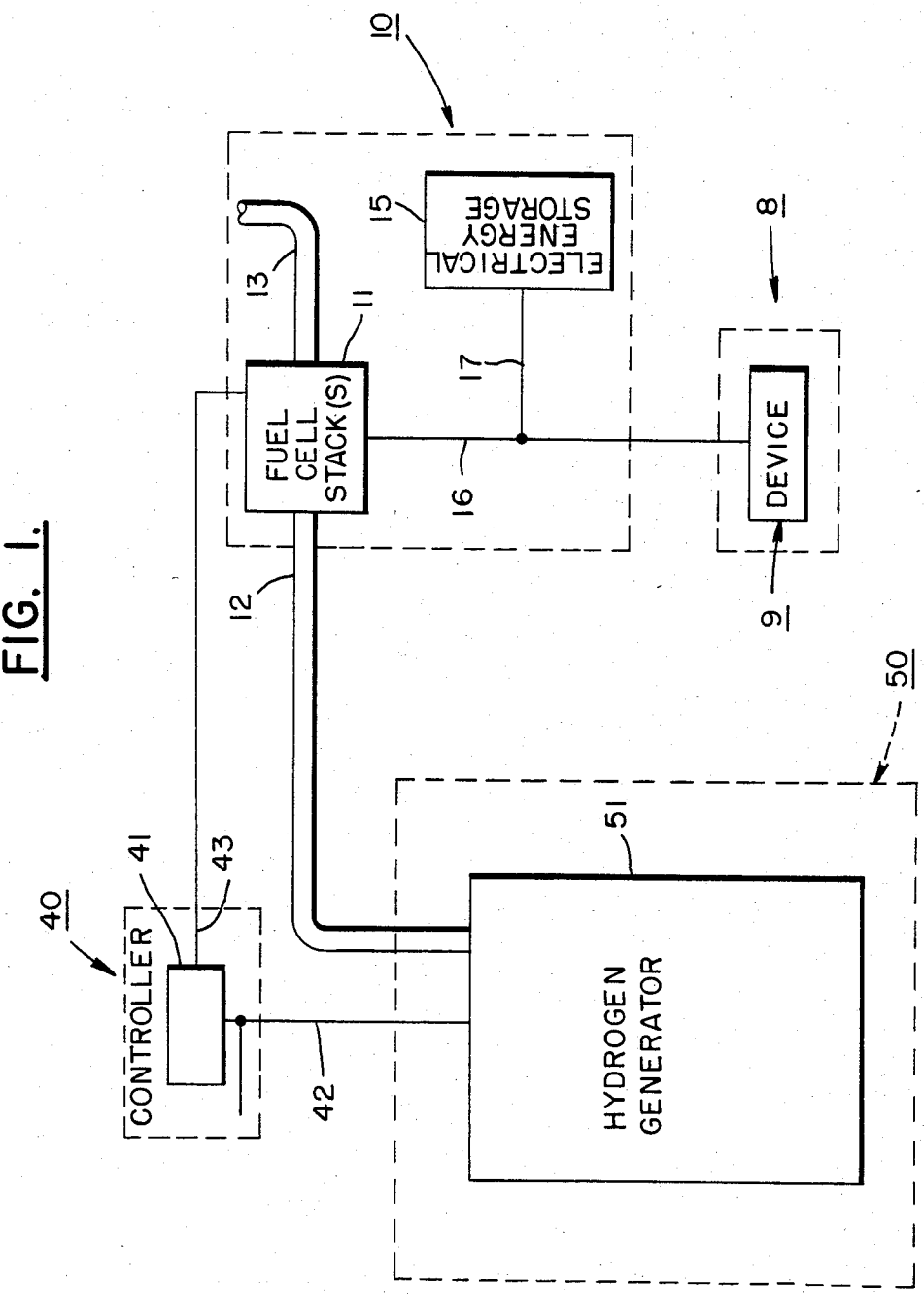
FIG. 1 is a schematic illustration of the hydrogen generator within a fuel cell system.

Referring more particularly to the drawings, wherein like reference numerals are used throughout to designate like elements, FIG. 1 schematically illustrates one embodiment of a system using the hydrogen generator. The hydrogen generator disclosed herein can be used for any suitable purpose where there is a requirement for hydrogen. It can be a free-standing apparatus, totally unattached and unintegrated into a larger system, used simply to generate hydrogen for any purpose whatsoever. It can also be a part of a larger system having a specific need for hydrogen. Purely for the purposes of convenience of description, the hydrogen generator is disclosed in association with a fuel cell herein. It should be understood, however, that its use is not restricted to this application.

The fuel cell system shown in FIG. 1 includes four major sub-systems sectioned-off in dotted-line boxes; energy cell 10, load 8, controller 40 and hydrogen generator 50. Energy cell 10 has at least one fuel cell and is depicted here as having a plurality of individual fuel cells arranged in one or more stacks. The term "fuel cell stack" means an arrangement whereby more than one individual cell is placed back-to-back in a stack fashion. Each cell can include a catalytic fuel electrode, to which hydrogen is fed, a catalytic oxidant electrode, to which air is fed, and an electrolyte member therebetween. The system requires no moving parts since air is supplied by diffusion and water created by the cells is vaporized and drained from the cell stack by wicking. Hydrogen is supplied to the fuel cells by the hydrogen generator. Individual fuel cells can be of any suitable type, for instance, they can contain an electrolyte of a solid polymer type and the stack construction can be of the bi-polar type as disclosed in U.S. Pat. No. 4,175,165.

The stack has a means for receiving a supply of hydrogen, line 12, and a means for removing excess fuel, bleed line 13. The bleed line is only a precautionary measure in the present system. Since the hydrogen generator is a demand responsive one, it is unlikely that much excess or waste hydrogen would be created. The fuel cell stack is connected to controller 40 by electrical line 43 and is also connected to load 8 by electrical line 16. The purpose of controller 40 is to turn the hydrogen generator on and off, and to regulate the rate of hydrogen generation. Although non-essential, energy cell 10 may also have an electrical energy storage means 15 which is connected to electrical line 16 between the stack and the load.

The purpose of stack 11 is to generate electrical energy or power to be used by load 9. The load, here depicted simply as containing device 9, can be any type of load requiring electrical energy to operate. One particular use for the presently described fuel cell system is as a power source for an ocean weather buoy which is placed in remote regions and is expected to be deployed in service for long periods of time. The devices of the buoy commonly needing a source of electrical energy are those that collect, store and transmit weather data to satellites, ground stations, or ships. Fuel cell systems are ideal for this purpose since they can be made compact, reliable, and selfregulating. Since such buoys do a variety of tasks, load requirements change over a period of time for the fuel cell stack. It is because of the varying load profile over a period of operation that it may be desirable to include electrical energy storage means 15, such as a surge battery, to carry the load requirements through periods of operational bursts.

In this embodiment, controller 40 enables hydrogen generator 50 to be regulated directly by the hydrogen requirements of the stack. The hydrogen generator is turned on and off and regulated by controller 40. Controller 40 can be any suitable device that operates in the manner intended. For instance, it can be a switch means, or relay 41, that is able to monitor, through line 43, the electrical energy output of a control cell (not shown) within the stack. Alternatively, it can be a rheostat to vary the hydrogen generation as a function of the current flow. The level of output from the control cell can control the switch that turns the generator on and off Any other suitable means can be used to automatically have controller 40 call for more hydrogen from generator 51 when the fuel cell stack needs it. For instance, a signal representing the pressure of the hydrogen within the consuming device or the temperature of the consuming device itself could be fed to a suitable, conventional control device within controller 40 to close and open the switch means to enable and disable, respectively, the operation of generator 51. In addition, a simple manually-operated switch or rheostat could be placed in controller 40 particularly in those instances wherein the hydrogen generator is a stand-alone apparatus for the generation of hydrogen for any use.

The configuration of generator 50 and the manner by which it forms hydrogen is discussed below in reference to FIGS. 2–4. The hydrogen produced by generator 50 in the system shown in FIG. 1 is fed from the generator 50 to fuel cell stack 11 through pipe line 12. In the case wherein hydrogen generator 50 is a stand-alone system, the hydrogen can be stored in any suitable container (now shown) connected to generator 50 by any suitable pipe line similar to line 12.

Figure 2:
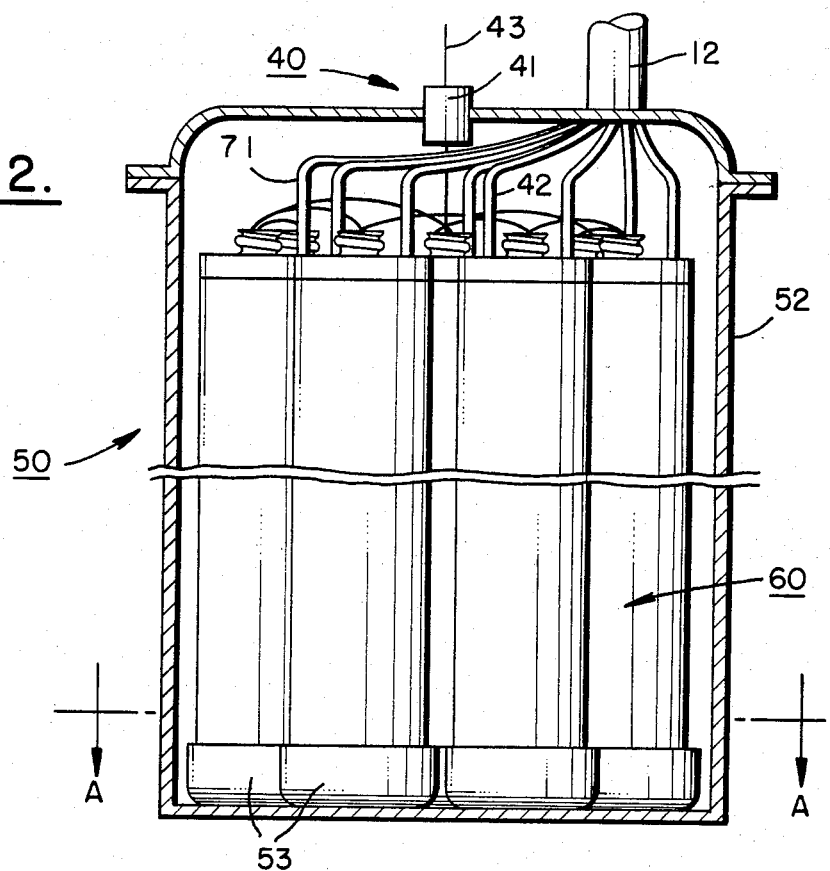
FIG. 2 is a schematic illustration of a plurality of cartridge-type hydrogen generators within a drum.
Figure 3:
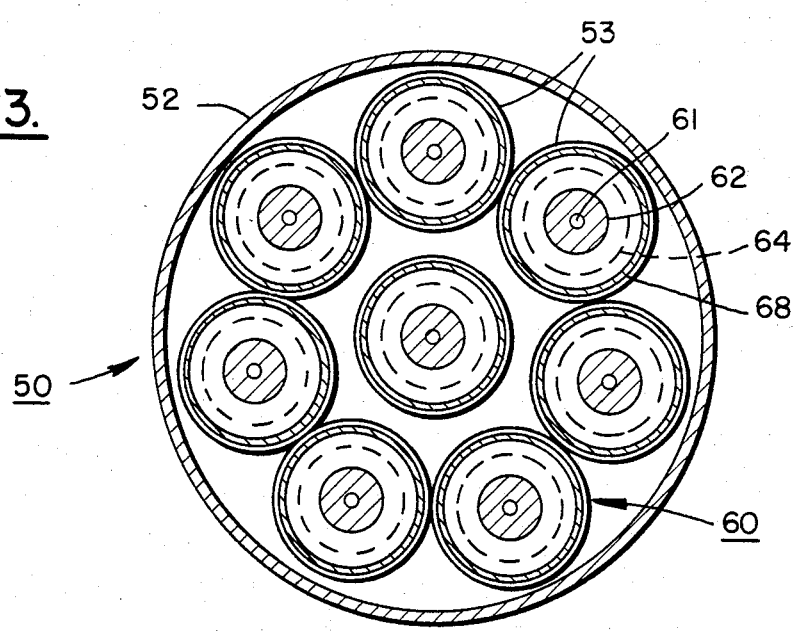
FIG. 3 is a view of the apparatus in FIG. 2 taken through section A—A.
Figure 4:
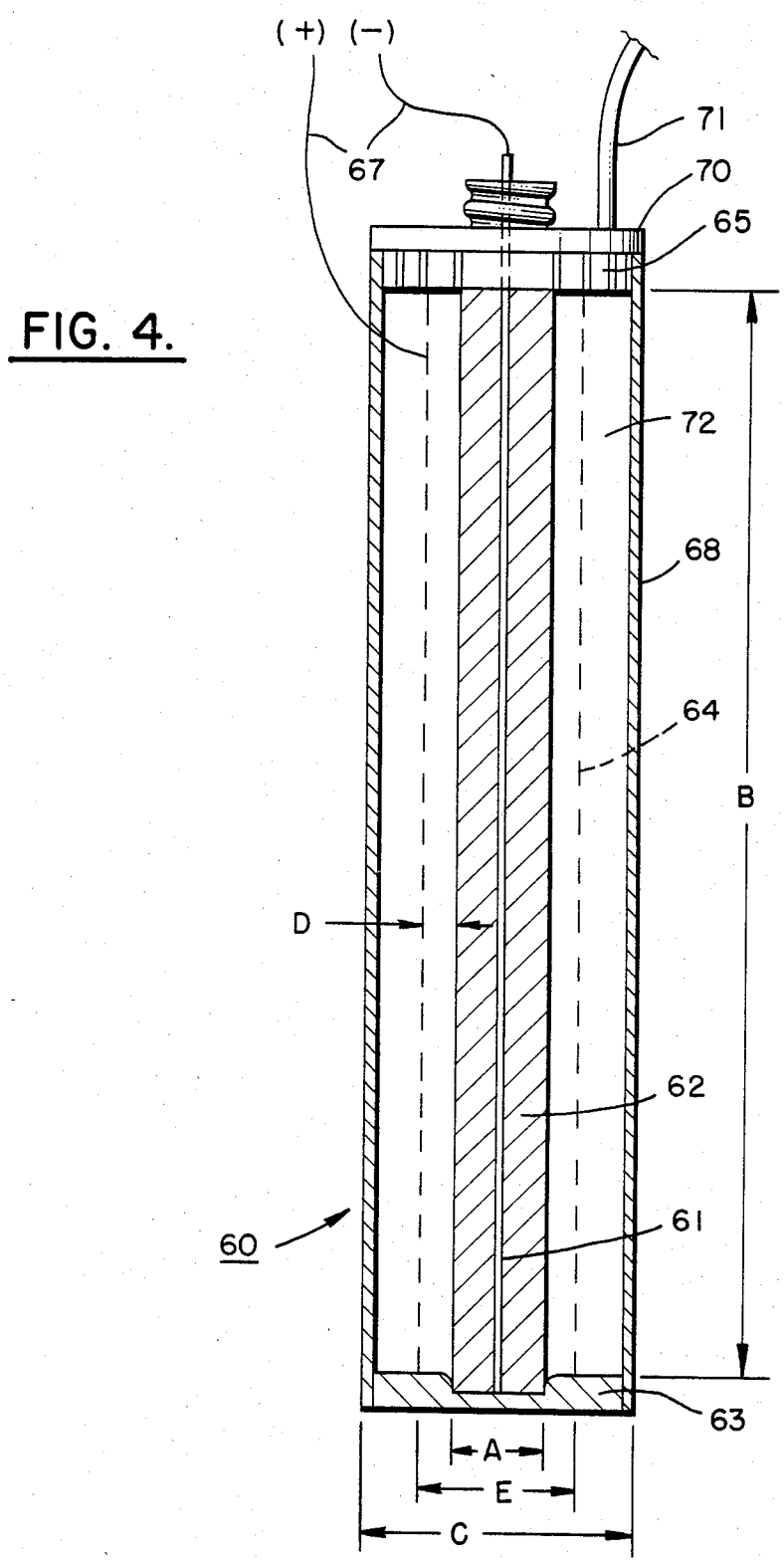
FIG. 4 is a schematic illustration of one embodiment of the cartridge.

Attention is now drawn to FIGS. 2–4 which illustrate the cartridges used in hydrogen generator 50. The generator, in this embodiment, has a cartridge holding means, drum 52, with a plurality of cartridges 60 located therein. The drum, when used with a system such as that depicted in FIG. 1, may be permanently attached to the fuel cell system main frame (not shown). The drum may have therein a means for locating and mounting cartridges 60 such as locators 53. The locators can be made of any suitable material such as an electrically insulating material. In this embodiment, the interior bottom surface of the drum contains a plurality of cartridge locators 53 which facilitate the insertion of cartridges 60 in the drum by providing a slightly larger opening than the periphery of the cartridges into which the cartridges can be inserted. The drum also provides electrical separation for the plurality of cartridges.

Each cartridge in the drum has a pipe means, such as hose 71, or merely an opening, which is adapted to allow the hydrogen produced by the cartridge to be fed to the fuel cell stack through feed line 12. Controller 40 is shown, in this embodiment, mounted to the drum and the cartridges and controller are shown as being electrically wired, in series fashion, by electrical wires 42. The cartridges are wired to each other and across the switch means, or relay, of controller 40 so that one continuous electrical circuit is made between the cartridges and switch. When the switch is open, no current is possible through this circuit. However, when the switch is closed, current flows through the circuit.

Basically, the cartridge contains a consumable anodic material, a cathodic material, an aqueous electrolyte therebetween and a means to complete the circuit between the anodic and cathodic materials when hydrogen is to be generated, thereby enabling electrical current to flow through the electrolyte between the anodic material and cathode. The generator relies at least partially on the process of anodic corrosion to produce hydrogen. The process of producing hydrogen is started simply by completing the circuit between the anode and cathode of the generator and allowing current to flow therebetween. Once the process begins, hydrogen is formed through the rapid anodic and chemical corrosion of the anodic material. Hydrogen bubbles form and rise to the top of the electrolyte. Magnesium hydroxide is also formed, remaining in the cartridge to be removed with the spent cartridge. The process is stopped or disabled by simply breaking the circuit between the anode and cathode.

The anodic material can be any suitable material useful for the purpose intended with a negative electrochemical potential relative to hydrogen. Suitable materials include magnesium, aluminum, and alloys of magnesium or aluminum such as those formed with manganese, zinc, iron, aluminum, and the like. These materials and other suitable materials are commercially available from, for instance, Dow Chemical Company, Midland, Michigan. The cathodic material can be any suitable material useful for the purpose intended. Suitable materials include steel, stainless steel, nickel-plated steel, platinum, etc., having a low over-voltage for hydrogen discharge. The electrolyte can be any suitable material useful for this purpose such as a conductive aqueous liquid which is preferably non-corrosive. One suitable material is salt water.

While the circuit connecting the anode and cathode of a cartridge remains uncompleted or in a state of high resistance; that is, when the switch means is set so that the circuit between the anode and cathode is broken or non-continuous, the anodic material passivates in the electrolyte and essentially no meaningful amount of hydrogen is formed. On the other hand, when the circuit connecting the anode and cathode is complete; that is, when the switch means is set so that the circuit between the anode and cathode is continuous, the passivating layer on the anodic material breaks down and rapid anodic and chemical corrosion takes place to produce hydrogen.

A preferred embodiment of the compact, replaceable cartridge is shown in FIG. 4. The cartridge has a container 68 which holds an anodic material 62 and electrolyte 72. The anodic material has a wire 61 therein which can carry the flow of electrical current. The container further has a steel sheet or mesh material 64 which serves as a cathode. Electrical leads 67 connected to wire 61 and steel mesh 64 are part of the electrical circuit that contains controller 40. The cartridge also includes base 63 and spacer 65 which hold the container, steel mesh and anodic material in place relative to each other and electrically insulated from each other. Spacer 65 has holes or other passage means therein which enable the hydrogen formed by the cartridge to rise to the top of the cartridge in the vicinity of cap 70 and then up through hose means 71 which feeds it into pipe line 12. Alternatively, the hose means 71 is merely an opening in the top of the cartridge and the hydrogen rises in drum 52 into pipe line 12.

Although steel mesh 64 is preferred for high rate of hydrogen generation, it is not necessary to the cartridge. In an alternative embodiment, the mesh is eliminated and container 68, if made of a suitable cathode material, can become the cathode. In this case, line 67 would be connected to the container wall instead of the steel mesh material. In a further embodiment, the container can be made of any material to hold the electrolyte which is coated on its inside with a suitable cathode material which is connected to line 67. The base can be any strong material such as polyethylene. Similarly, the spacers can be any suitable material such as a PVC material.

The anodic material can be made of an extruded magnesium that is available commercially from Dow Chemical Company. The mesh can be made of an expanded carbon steel material. The electrolyte can be salt water with the concentration of the salt solution being between about 0.1% and about 20%. It is preferred to have the salt solution concentration between about 2% and about 10%. The cartridges can be stored without the water being added until just prior to use. The shelf life of the cartridge would be indefinite in this case. If the cartridges already have the salt in the container, the cap can be removed such as by being unscrewed, water added, and the cap replaced, to activate the cartridge a few hours before intended use.

The configuration and geometry of the cartridges are such to produce the desirable features of high energy density, high rate of hydrogen generation, high utilization of reactants and fast response time for turning the generator on and off. The preferred embodiment of the cartridge, as depicted in the figures, is to make it substantially cylindrical. The axis of the cylinder is preferred to be substantially vertical when in use and the height of the cartridge, and particularly the anodic and cathodic materials, is large relative to its diameter. Thus, for example, in FIG. 4, container wall 68 is in the shape of a cylinder standing on its end and anodic material 62 and mesh 64 are also cylinders substantially concentrically located within the container. The cartridge is preferably in a substantially vertical orientation when in use in order to have the electrolyte contact the whole surface of the anodic material and to have the rising hydrogen bubbles cause a circulation of the electrolyte and keep it well-distributed in the container. Although the cartridges described herein are essentially cylindrical in configuration, it should be understood that the cartridge or any of its various elements can be made in any suitable shape which will operate in the manner intended.

The cartridge combination achieves its desirable features by a combination of aspects including anode-to-cathode distance, the amount of surface area of anode and cathode available, the anodic material-to-electrolyte volume, the stoichiometric ratio of anodic material to the water in the electrolyte being relatively low, the surface-to-volume ratio of the anodic material, and the effective use of the electrolyte. It has been found that the geometry of the cartridge and electrodes preferrably fall within certain limits. The ratio of surface area to volume of the anodic material is relatively high and preferably not less than 2. The rate of and completion of electrolyte consumption depends on how small the space between the anode and cathode can be made considering the production of magnesium hydroxide. The ratio of anodic material, such as a magnesium extrusion, to the aqueous electrolyte on a volume basis falls within the range of about 1:4–40 with about a 1:8 ratio being preferred. The clearance between the anode and cathode, or distance "D" in FIG. 4, is as close as possible commensurate with the production of magnesium hydroxide along with hydrogen by the cartridge. A clearance of about 3–100 millimeters should be used with a distance of approximately 15 millimeters being preferred when a mesh-type cathode is being used. The dimensions provide a very high rate of hydrogen output for the given volume and weight.

A cartridge of the following configuration was tested with satisfactory results. Referring to FIG. 4, a magnesium extrusion was used for anodic material 62, and two layers of expanded carbon steel screen for cathode 64. The magnesium extrusion had a centrally located steel rod attached to line 67 and the electrolyte was salt water having about a 10% sodium chloride concentration. Container 68 was made of steel and had a diameter "C" of about 15 centimeters. The magnesium extrusion had a length "B" of about 80 centimeters and a diameter "A" of about 5 centimeters. The diameter "E" of the steel mesh was about 7.5 centimeters.

A second smaller cartridge was also tested with satisfactory results. In this case, the same materials were used for the components of the cartridge, but the sizes of the components of the cartridge were all significantly smaller. For instance, the magnesium anodic material was only about 30 centimeters long. In this instance, it was found desirable to increase the height of the container relative to the height of the magnesium extrusion to provide sufficient electrolyte to the cartridge. The cartridge height was increased approximately 50% over the magnesium extrusion height to provide a reserve of electrolyte liquid which assured that the magnesium extrusion was completely immersed in electrolyte during the full practical life of the cartridge.

The use of magnesium and alloys of magnesium to react with salt water is particularly attractive for the generation of hydrogen. Magnesium provides a high energy density, is economical on a kilowatt-hour basis and the magnesium hydroxide formed from the reaction presents no particular disposal problem. Most importantly, however, magnesium is a safe material to use for this purpose based on the fact that the reaction can be readily controlled.

Referring again to the system in FIG. 1, upon start up of the system, hydrogen is generated in generator 50 and supplied to stack 11 through feed line 12. This start up process can be controlled external to the fuel cell system by any convenient manner such as by having the operator manually override controller 40 so that the generator is operated until the electrical energy output of the full stack is at its normal operating level. This point of operation, as described in one of the embodiments herein, can be indicated by the use of a control cell (not shown) in stack 11.

The control cell is arranged in the stack so that as the stack begins to run out of hydrogen, the depletion first shows up in the control cell at a time when the rest of the individual cells in the stack still have enough hydrogen to operate at normal output. As the control cell is starved for hydrogen, its electrical energy output drops off. At a predetermined level of control cell output, the switch means, relay 41, is activated by the output and switches to complete the circuit joining the anodes and cathodes of the generator cartridges. The completing of the circuit, per se, enables the cartridges to produce hydrogen. Once additional hydrogen is fed to the control cell, the output of the control cell rises again and relay 41 is deactivated thereby making the switch break the circuit joining the anodes and cathodes of the cartridges. The breaking of the circuit disables the cartridges from producing hydrogen.

One device found useful for this purpose is a mercury-wetted contact relay manufactured by C.P. Clare and Company, Chicago, Ill. 60645. It is identified as Number HGS 1015 in the "Electronic Engineers Master Catalog—EEM 77–78", Volume II (20th edition). Controller 40 receives control cell output on electrical line 43. The circuit to the cartridges is carried through electrical line 42. Thus, once the fuel cell has enough hydrogen during the start up procedure, the operator allows controller 40 to take charge of the system. Since there is sufficient hydrogen in the stack and all cells are operating at normal level, controller 40 disables the fuel generator. The generator remains disabled until the output of the control cell calls for hydrogen.

The fuel cell system described herein is self-contained and self-regulating. The production of hydrogen is carried out by a system that responds to the needs for hydrogen of the fuel cell stack. The production of hydrogen is precisely matched to the needs of the fuel cells. The controller and hydrogen generator operate substantially instantaneously when hydrogen is required. The response of the system is so good that there is little or no need for the bleeding off of excess hydrogen in the stack.

It should be understood that the foregoing description is only illustrative of the invention. Alternatives and modifications in the structural and functional features of the hydrogen generator can be devised by those skilled in the art without departing from the invention. Accordingly, the present invention is intended to embrace all such alternatives, modifications and variations which fall within the spirit and scope of the appended claims.

I claim:

1. A hydrogen generator of the type which relies at least partially on the process of anodic corrosion to generate hydrogen comprising:
    (a) a drum means,
    (b) a plurality of cartridges in the drum means, each cartridge having a container with an aqueous electrolyte therein, an anodic material mounted in the container having a relatively high ratio of surface area to volume, a cooperating cathode mounted in the container closely spaced from the surface of the anodic material and means for removing hydrogen from the cartridge,
    (c) means for feeding the hydrogen removed from the cartridges out of the generator, and
    (d) means for activating the cartridges allowing electric current to flow to produce hydrogen.

2. The generator as in claim 1 wherein the cartridge container is the cathode and the containers are electrically insulated from one another.

3. The generator as in claim 1 further including a device operatively attached thereto which utilizes the hydrogen produced thereby.

4. The generator as in claim 3 wherein the further device is a fuel cell.

5. The generator as in claim 3 wherein hydrogen is generated in response to demand by the device.

6. The generator as in claim 1 wherein the cartridges are replaceable.

* * * * *